Feb. 23, 1965    J. J. CRAWFORD ETAL    3,170,584
AUTOMATIC SELF BUNCHING AND DISPENSING BALE CARRIER
Filed Nov. 20, 1963    3 Sheets-Sheet 1

INVENTORS.
JOHN J. CRAWFORD
ROBERT L. CRAWFORD
BY
Kimmel & Crowell
ATTORNEYS.

Feb. 23, 1965  J. J. CRAWFORD ETAL  3,170,584
AUTOMATIC SELF BUNCHING AND DISPENSING BALE CARRIER
Filed Nov. 20, 1963  3 Sheets-Sheet 3

INVENTORS.
JOHN J. CRAWFORD
ROBERT L. CRAWFORD
BY
Kimmel & Crowell
ATTORNEYS.

United States Patent Office 3,170,584
Patented Feb. 23, 1965

3,170,584
AUTOMATIC SELF BUNCHING AND DISPENSING
BALE CARRIER
John J. Crawford and Robert L. Crawford, both of
Rte. 3, Box 548, Corvallis, Oreg.
Filed Nov. 20, 1963, Ser. No. 327,574
6 Claims. (Cl. 214—504)

This invention relates to novel and useful improvements in bale carriers for the traveling type of hay balers and the like, and in particular, to a powered and automatic self bunching and dispensing type of bale carrier which may be attached as an accessory to the traveling type of baler.

The conventional traveling type of baler periodically discharges each individual bale of material onto the ground along its path of travel which later has to be individually loaded onto a truck, wagon, traveling platform or the like. Such type of baler has the attendant problems of necessitating undue scarce and costly labor or expensive conveying equipment to load such individual bales of material.

Our new baler carrier solves the above problems by cutting travel costs of at least one fourth or more of that of individually retrieving the bales of material from a harvest field by bunching and periodically dropping the bales of material in individual groups of at least four bales along the path of travel of the baler.

The primary object of this invention is to provide a bale carrier adapted to be attached to and powered by a traveling baler machine or tractor including means to accumulate a number of bales of material on the carrier and further means to automatically and periodically deposit the bales in groups upon the ground.

Another object of the invention is to provide an automatic actuated bale carrier which may be quickly and easily attached to, and detached from, a traveling baler of materials.

A further object of the invention is to provide an automatic type of bale carrier including positive actuated reciprocating means to uniformly distribute and load the bales of material upon the carrier prior to a subsequent dumping of a group of bales of material upon the ground or the bed of an accompanying traveling vehicle.

A still further object of the invention is to provide a new, sturdy and reliable automatic bale carrier and buncher adapted to carry, accumulate and periodically dispense a group of bales of material upon the ground or the like.

Another object of the invention is to provide means for automatically conditioning the carrier to periodically and selectively receive bales of material from a baler subsequent to dispensing a group of bales of material on the ground or the like.

With these and other objects in view, the invention includes certain novel features hereinafter described with reference to the drawings which accompany and form a part of this specification.

Referring to the drawings:

FIGURE 6 is a part sectional view of FIGURE 2 taken on lines 6—6 in the direction of the arrows.

Referring more specifically to the drawings, in which similar reference numerals refer to like parts:

Figure 1:
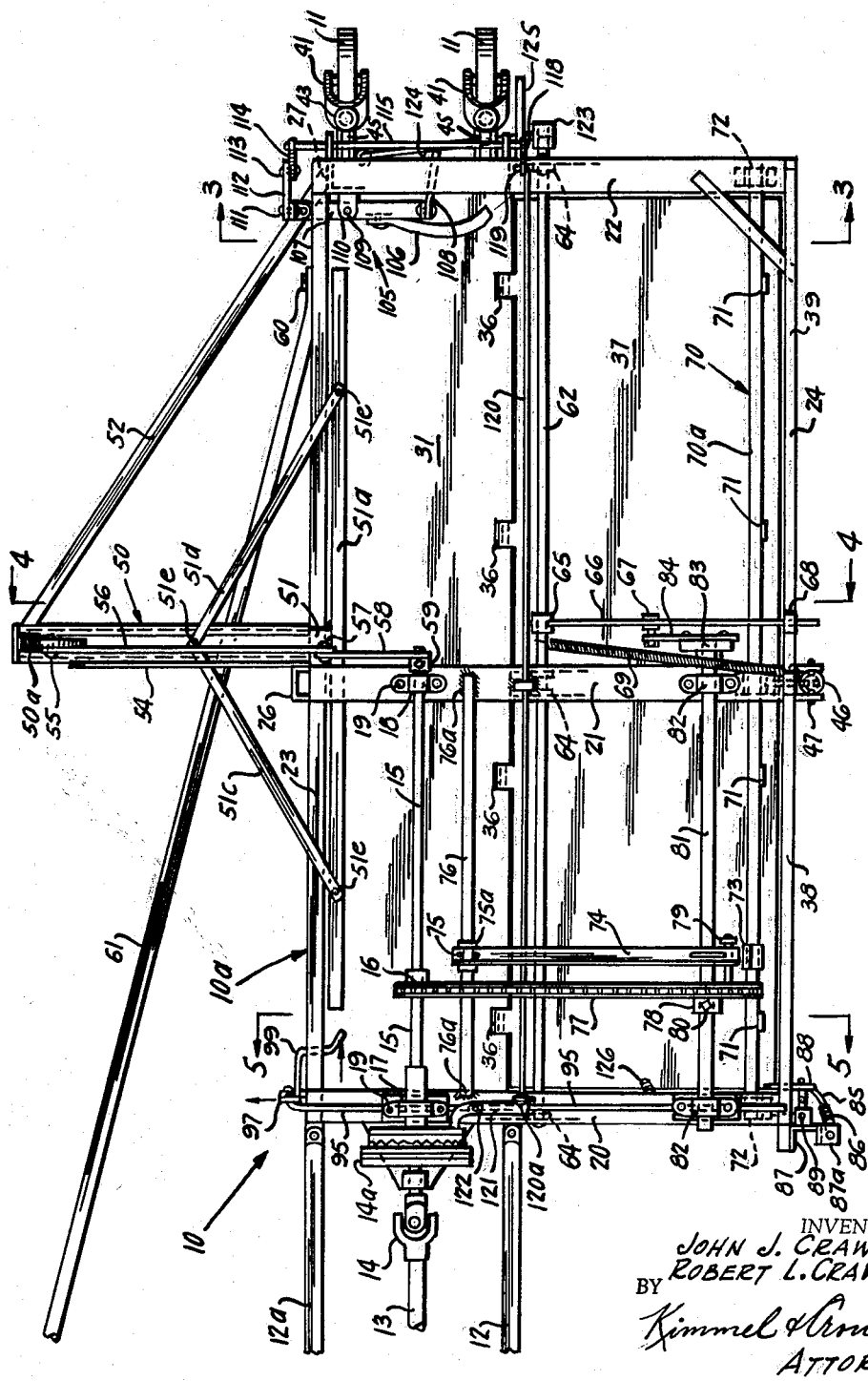
FIGURE 1 is a plan view of the bale carrier with bale loading, bunching, and dispensing means connected to a power take-off of the baler.

FIGURES 1 through 6 illustrate an exemplary embodiment of the invention, in which reference numeral 10a generally represents the main structure of the box-like frame means of the carrier 10 which is carried and supported by a pair of swivel mounted land wheels 11 and connected by a three point hitch including draw bar means 12 and 12a and brace bar 61 to a baler unit, not shown. Power shaft means 13 is operatively connected to the power take-off of the baler. Shaft means 13 is connected by differential joint means 14 to instantaneous positive clutch means 14a mounted on shaft means 15.

Shaft means 15 carries chain sprocket means 16 intermediate its end portions which are suitably mounted in bearing means 17 and 18 secured by bolt means 19 to frame structure 10a of a carrier means 10 at cross members 20 and 21, as shown.

The top portion of the box-like structural frame means 10a of bale carrier 10 is comprised of welded structural shapes including cross members 20, 21, and 22 suitably attached to top longitudinal members 23 and 24 which are connected by welding or other suitable means to vertical members 25, 26, 27, 28, and 29 to bottom means 31 including longitudinal members 32 and 33, and end members 34 and 35 of carrier means 10.

Bottom means 31 is secured by plural hinge means 36 to gate bale drop means 37.

Structural members 20, 22, and 24 overhang gate drop means 37. Structural member 24 is reinforced by lateral structural members 38 and 39 and vertical member 40 as best shown in FIGURE 2.

Figure 2:
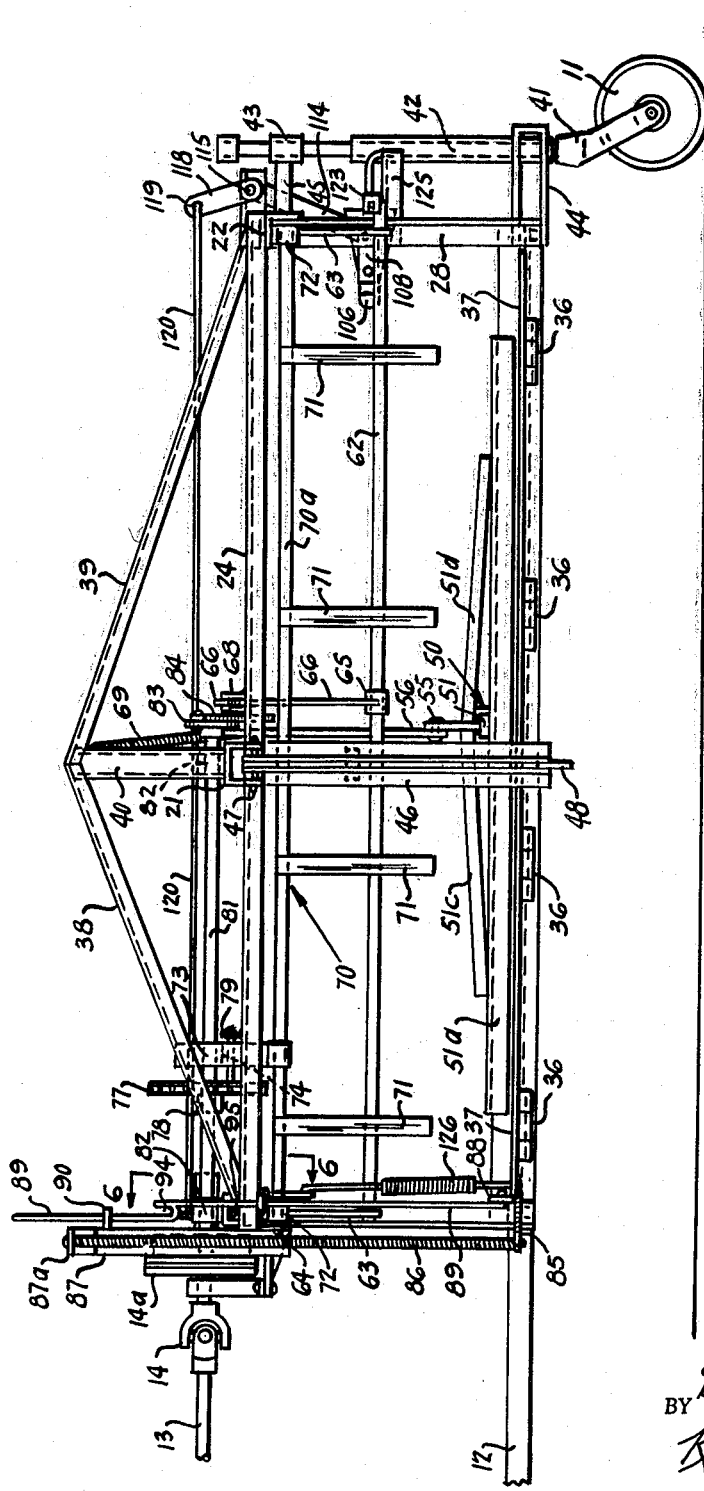
FIGURE 2 is a longitudinal elevation view of the bale carrier and buncher in traveling position before attachment to a baler.
Figures 3, 4, 5:
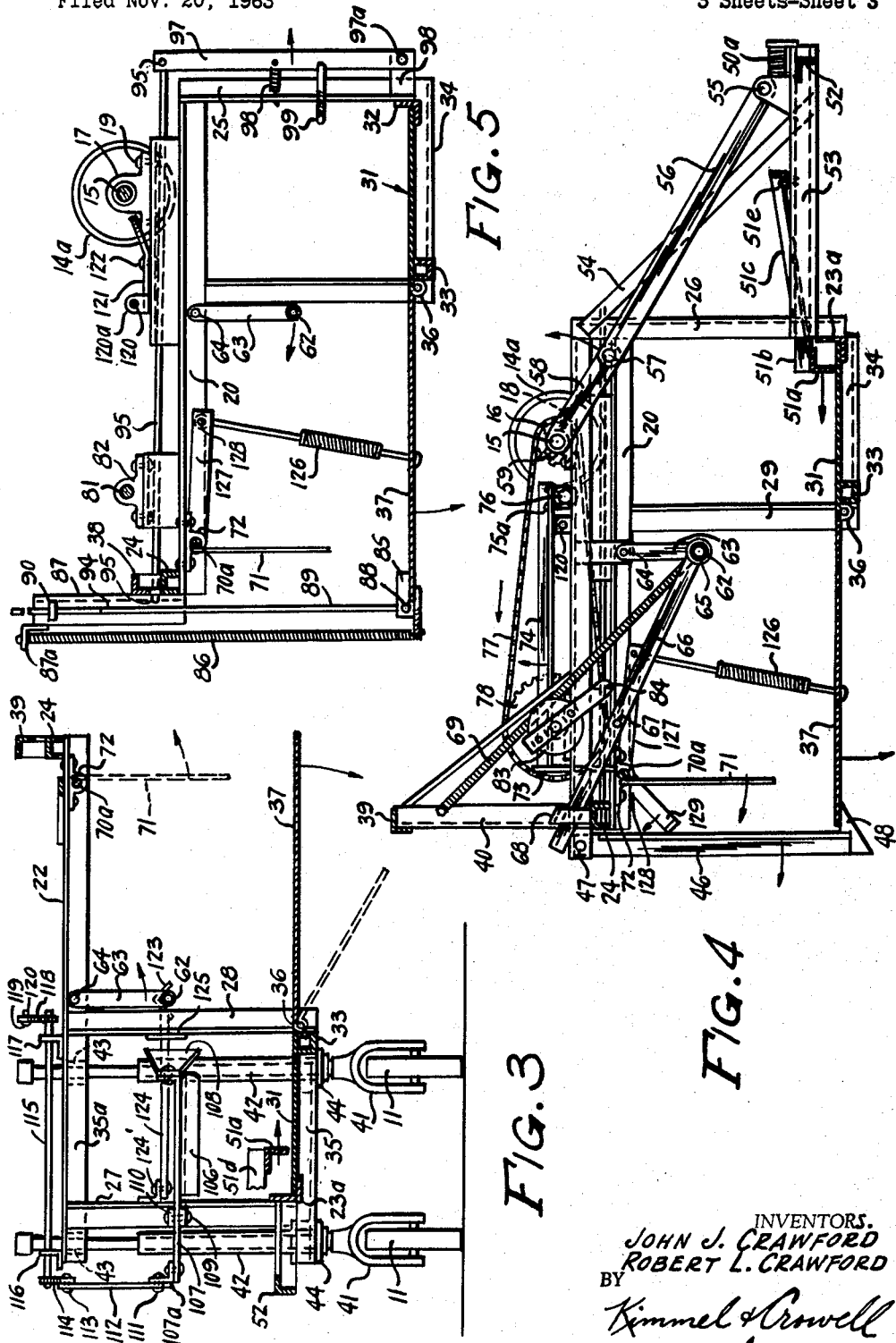
FIGURE 3 is a rear end cross-sectional view of FIGURE 1 taken on lines 3—3 in the direction of the arrows.
FIGURE 4 is an intermediate cross-sectional view of FIGURE 1 taken on lines 4—4 in the direction of the arrows.
FIGURE 5 is a front end cross-sectional view of FIGURE 1 taken on lines 5—5 in the direction of the arrows.

Ground wheel means 11 are pivotally supported in bifurcated fork means 41 in bearing means 42 and 43 secured by structural means 44 to member 35 and by structural means 45 secured to structural means 35a, respectively, as best shown in FIGURES 2 and 3.

Drop door or table means 37 is engageably secured in horizontal position by door latch means 46 hingedly connected by pin means 47 to the outer end portion of horizontal member 21 secured to structural member 24. The lower end portion of latch means 46 fixedly carries latch catch means 48 to selectively engage the outer edge of drop table means 37, as best shown in FIGURE 4.

On the back longitudinal side portion of structural frame means 10a is an additional fixed channel structural mounting means 50 for reciprocating bale pusher means 51 of a T-shape. Structural means 50 is secured at its front end portion to structural member 23a and at the distal end 52 to lateral structural member 53. Structural means 50 is further secured by lateral bar means 54 to member 26, best shown in FIGURE 4.

The flat portion 51a of reciprocating T-shaped bale pusher means 51 selectively abuts the back longitudinal portion of a bale of material during operation. The intermediate portion 51b of member 51 reciprocates in fixed channel means 50 by being hingedly connected by pin connecting means 55 to linkage member 56 connected by pin means 57 to crank means 58 secured by set screw 59, or other desired means, to shaft means 15, as shown in FIGURES 1 and 4. Reciprocating T-shaped bale pusher means 51 is structurally reinforced against lateral strain by members 51c and 51d connected by suitable bolt 51e or rivet means as indicated in FIGURE 1. At the outer end of channel means 50 is a compression spring 50a which bale pusher means 51 comes against to hold linkage member 56 and crank means 58 off center when clutch 14a is neutral.

Structural frame means 10a is laterally connected by bolt means 60 to the brace bar 61 which forms part of the three point hitch referred to hereinbefore.

Clutch means 14a is normally spring biased to the disengaged position in any conventional manner within the purview of this invention.

Rod means 62 serves as a guide means for the first two bales of material of a bale drop as they leave the baler which in turn serve as guide means for the two remaining bales of the drop. Guide rod means 62 is hingedly secured at its ends by depending crank linkage means 63 secured by suitable pin and bearing means 64 to upper structural members 20, 21 and 22 in bearing means 72 in a suitable conventional manner, as best shown in FIGURES 1, 2, 3, and 5. The center portion of guide rod means 62 is secured by bearing means 65 or other suitable means to lever means 66 which intermediately carries projecting pin and screw bolt means 67 and reciprocates selectively in keeper means 68 fixedly mounted on upper longitudinal structural member 24. Swinging guide bar means 62 is spring biased by spring means 69 to raise bar means 62 when released from catch means 123. Spring means 69 is connected between bar means 62 and structural member 24 by conventional connections such as pins, bent ends of the spring 69 and the like.

Gate means 70 comprises bar means 70a and finger means 71. Bar means 70a has fixed thereon downwardly projecting finger means 71 located thereon in selectively spaced relationship. Gate bar means 70a is rotatably secured at its ends in bearing means 72. On the forward end portion of bar means 70a is secured an upwardly extending dog means 73, as seen in FIGURE 1, which selectively contacts the end of bar means 74 rotatably secured at 75 by bearing means 75a to shaft means 76 secured at its end portions 76a by weldment or other suitable means to upper structural members 20 and 21. Sprocket means 16 drives chain means 77 connected to sprocket means 78 in a ratio of two turns of sprocket means 16 to one turn of sprocket means 78. Sprocket means 78 rotatably carries projecting bolt and pin crank means 79 and is secured by screw means 80 to shaft means 81 mounted in bearing means 82 on structural members 20 and 21.

The rear end portion of shaft means 81 carries thereon rotary crank ratio means 83 having a depending arm means 84 thereon to rotatably contact pin means 67 of link means 66 as best seen in FIGURE 1.

Drop door or table means 37, in FIGURE 2, has a welded angle or bracket means 85 attached thereto which is laterally connected to tension spring means 86 attached to the top portion 87a of upstanding structural member 87 of structural frame means 10a. Bracket means 85 is pivotally connected by pin means 88 to upwardly reciprocating hold down rod means 89 having notch means 94 thereon and reciprocably secured in keeper means 90 fixedly secured to structural means 87 as more clearly shown in FIGURES 2, 5, and 6, in which the front end portion of reciprocating rod means 95 engages notch means 94 of rod means 89 in the hold down position of drop table means 37 and rod means 89 after dropping a bunch of bales of material.

Rod means 95 is reciprocably secured in bearing means 96, 82, and 17, as shown in FIGURE 5.

Rod means 95 is pivotally connected by pin means 96 to link member 97, which is pivotally secured by pivot means 97a to bracket means 98 fixedly attached to vertical structural member 25. Link member 97 is biased by tension spring means 98 connected to structural member 25. Link member 97 carries offset contact bar means 99 which is contacted by bales of material leaving the baler to overcome the bias of spring means 98 to unbias the linkage and rod means 95 thereby disengaging the same from the notch means 94 of rod means 89 permitting drop table means 37 to be returned to its horizontal position by spring bias means 86.

At the rear or distal end of structural frame means 10a, as best shown in FIGURES 1 and 3, a general linkage means 105 is connected comprising bale pusher control means 106 fixedly connected to lever means 107 connected by suitable means to bar means 108 and pivoted horizontally by fulcrum pin means 109 attached by bracket means 110 to frame member 27. Lever means 107 at its distal end has an upwardly extending fixed lever bracket portion 107a connected by pin means 111 to link member 112 further connected by pivotal pin means 113 to crank lever means 114 suitably mounted on the end of rotary rod means 115 secured in suitable bearing means 116 and 117, respectively, secured by welding or bolt means to upper structural member 22. The front end of rod means 115 has suitably fixed thereon crank member 118 secured by pivotal pin means 119 to pull rod means 120 reciprocably mounted in keeper means 64 mounted on structural member 21. The other end of pull rod means 120 is pivotally connected by connecting means 120a to lever means 121 fulcrumed about pivot means 122 mounted on structural member 20 which is further and operatively connected to a spring biased fork means within conventional clutch means 14a, as understood by those skilled in the art, to engage clutch means 14a with drive shaft means 15 when the end of a bale of material contacts pusher bar means 106 to actuate linkage means 105 and puller rod means 120.

The distal end of hinged bale guide bar means 62 is secured in the downward position by notched keeper means 123 secured to rod means 124 spring biased and secured, in any conventional suitable manner as understood by those skilled in the art, to bracket means 125 attached to structural frame means 10a. When pusher means 106 is contacted by a bale of material, linkage means 105 operates pusher rod means 120 to actuate clutch means 14a and bar member 108 pushes against rod means 124 to disengage notch keeper means 123 from the end of guide rod means 62 allowing guide rod means 62 to swing upwardly due to action of spring bias means 69. After a bale dropping action, reciprocating rod means 66 and ratio crank means 83 returns guide rod means 62 to its downward position to again engage notch keeper means 123.

In the operation of clutch means 14a, pin means 79 and 67 are properly sequenced with relation to crank means 58 to provide proper selective operation of link bearing members 63 of rod means 62 and raising of link bar means 74 to disengage detent means 73 preparatory to a bale drop.

During a bale drop, rod means 62 is free to swing upward, gate means 70 is disengaged by detent means 73 and bar means 74. Bales of material are pushed against door latch means 46 by bale pusher means 51 which trips bale drop means 37 which activates elements 126, 127, and 129 to hold latch means 46 out of the path of bales dropping on the ground or on the bed of an accompanying traveling vehicle. When bale drop means 37 is returned to the carrying position, elements 126, 127, and 129 relatch to means 46 after the bale dump.

During operation, a bale of material leaving the baler enters the chute means or back longitudinal portion of carrier means 10 and presses release lever member 99 which further releases rod means 95 from contact with hold down rod 89 to allow drop table 37 to be raised by spring means 126 and secured by latch means 46 in a horizontal position. Subsequently, another bale of material enters the chute means and presses the first bale of material against actuating lever means 106 which actuates pull rod means 120 to actuate clutch means 14a which rotates shaft means 15 and crank means 58 and releases guide bar means 62 and actuates bale pusher 51 to push the two bales of material in the chute means onto drop table means 37. This same operation is repeated for another two bales of material on the chute means to actuate lever means 106 and engage clutch means 14a which for this second sequence of two bales of material operates shaft means 81 and pin means 67 and 79 to raise bar means 74 and to release detent means 73, respectively, and simultaneously actuate pusher means 51 to push the four bales of material forward against gate finger means 71 which rotates rod means 70a in a suitable direction to drop by gravity all four bales of material in a bunch on the ground. Then the buncher repeats the above cycles of operation for each four bales of material received from a harvest field by the baler and rearwardly fed into the carrier and buncher 10 along the path of travel of the combination.

After each cycle of operation of bale pusher means 51, crank ratio means 84 with pin means 67 reciprocates link means 66 rearward to push bale guide bar means 62 downwardly to be held in place by notch securing means 123.

The ratio of sprocket means 16 to that of sprocket means 78 is such that detent means 73 is unlatched for the dropping cycle of the operation of carrier means 10.

It is to be understood that instant bale buncher is not limited to a four bale drop but may be reasonably enlarged to include 6, 8 or more bales of material in an individual bale drop within the purview of this invention, as understood by those skilled in the art.

From the foregoing, it will now be seen that there is herein provided an improved automatic bale carrier and buncher which accomplishes all the objects of this invention, and others, including many advantages of great practical utility and commercial importance.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention set forth in the appended claims.

We claim:

1. In combination with a traveling baler, an automatic actuated traveling carrier and bale buncher connected to said baler for collecting, bunching and dumping bales of material on the ground or on a traveling platform comprising a plural bale carrier means including a box-like structural frame support means, ground wheel means for traveling support of said frame means, draw bar means for connecting said carrier means to said baler, power take-off means from said baler including spring biased clutch means operatively connecting said baler to said carrier means, a delivery chute means for receiving said bales of material, drop table means hingedly secured to said chute means, biased catch release mechanism means operatively secured to said drop table means, and reciprocating mechanism means selectively operated by said clutch means to drop said drop table means and discharge accumulated bales of material on said chute and said table means periodically, and bale actuated mechanism for selectively actuating said clutch means, said reciprocating mechanism and said drop table means to bunch and discharge bales of material onto the ground.

2. An automatic actuated carrier and bale buncher as in claim 1 wherein said chute means includes a longitudinal bale gate means comprising a rotatable shaft means having a plurality of spaced depending fixed fingers thereon operatively and selectively connected by mechanical detent means to said clutch means to release said bales when said drop table is released to drop a deposit of bales of material.

3. An automatic actuated carrier and bale buncher as in claim 2 wherein said chute means includes a bale guide means comprising a rod means having digitated bar means fixed thereon and suspended by plural linkage bearing means rotatably secured to said frame structure and spring biased linkage means selectively connected by reciprocating linkage means, connected by rotary cam-like pin means secured to rotary shaft means interconnected by chain and sprocket means to said rotary clutch means.

4. An automatic actuated carrier and bale buncher as in claim 3 including a biased detent hold down rod and linkage means for holding said drop table in the drop position and releasing the drop table to the horizontal position when a bale of material enters said chute means.

5. In combination with the delivery end of a traveling baler, an automatic actuated bale carrier and buncher comprising carrier structural support frame means, power take-off means from the baler, clutch means selectively connected to said take-off means, a first drive shaft means rotatably mounted in bearing means in said frame means operatively connected to said clutch means, a second drive shaft means interconnected by chain and sprocket rotatable linkage means to said first drive shaft means, said support frame means including a bale chute means and a hingedly secured drop table means operatively connected longitudinally to said chute means and connected by rotatable release means actuated by said second drive shaft means, a hinged guide bar means mounted longitudinally in suitable bearing means within said structural frame means along the open side of said chute means including spring bias means between said frame structure and said guide bar means, reciprocating bale pusher means selectively connected by linkage means and crank means to said first drive shaft means, bale pusher means reciprocably secured in a guide means and attached to said frame means including linkage means operatively connected to a crank means mounted on the end of said first drive shaft means, hold down rod means having a notch recess means thereon and pivotally secured to said drop table means reciprocably secured within an upper keeper means attached to said frame structure, a spring biased press bar and linkage means including a reciprocable rod means cooperating and engaging said notch means on said hold down rod means to hold drop table means down when a bunch of bales of material are discharged and means to release said drop table for return by tension spring means attached to said frame structure to return said drop table means thereafter to its horizontal position for engagement with a latch means after a bale drop, and pusher release actuating means at the distal end of said chute means comprising engaging notch-like keeper means for selectively and releasably engaging the distal end of said bale rod guide means when in the downward position, and plural linkage means connecting said clutch means connected to said first drive shaft means, and bar contact means connected to said pusher actuating means for contacting a bale of material when said chute means becomes filled with bales of material to engage said clutch means to disengage said guide rod means from its notch keeper to actuate said bale pusher means to push sidewise, at least, two bales of material onto said drop table means, sequence linkage and rotating mechanical ratio crank means operably connected to detent means connecting said second drive shaft means with a pivoted latch means on said frame means to actuate said bale pusher means and said guide bar means to release said drop table means when two bales of material are in said chute means and two bales of material are on the drop table means depositing said bunch of bales of material onto the ground.

6. An automatic actuated bale carrier and buncher as in claim 5 including rotatable gate means over the outer edge of said drop table means and actuated spring biased detent engaging means and linkage means interconnecting said gate means with a crank means on the end of said second drive shaft means to release said bales when said drop table means is released during a bale drop.

References Cited by the Examiner

UNITED STATES PATENTS

| | | |
|---|---|---|
| 2,605,915 | 8/52 | Day. |
| 2,845,770 | 8/58 | Fesseler _____ 56—473.5 |
| 3,010,593 | 11/61 | Adams et al. _____ 214—519 |
| 3,123,239 | 3/64 | Shoemake et al. _____ 214—508 X |

FOREIGN PATENTS

| | | |
|---|---|---|
| 557,493 | 5/58 | Canada. |
| 732,088 | 6/55 | Great Britain. |
| 826,223 | 12/59 | Great Britain. |

HUGO O. SCHULZ, *Primary Examiner.*

GERALD M. FORLENZA, *Examiner.*